Figure 1:
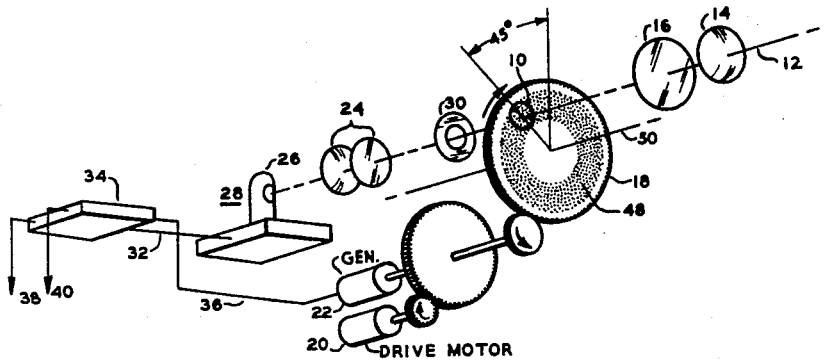

June 14, 1960     S. HANSEN     2,941,080
ASTROMETRICAL MEANS AND METHOD

Filed Nov. 6, 1948     2 Sheets-Sheet 1

INVENTOR.
SIEGFRIED HANSEN
BY Frank J. Epstein

June 14, 1960 S. HANSEN 2,941,080
ASTROMETRICAL MEANS AND METHOD
Filed Nov. 6, 1948 2 Sheets-Sheet 2
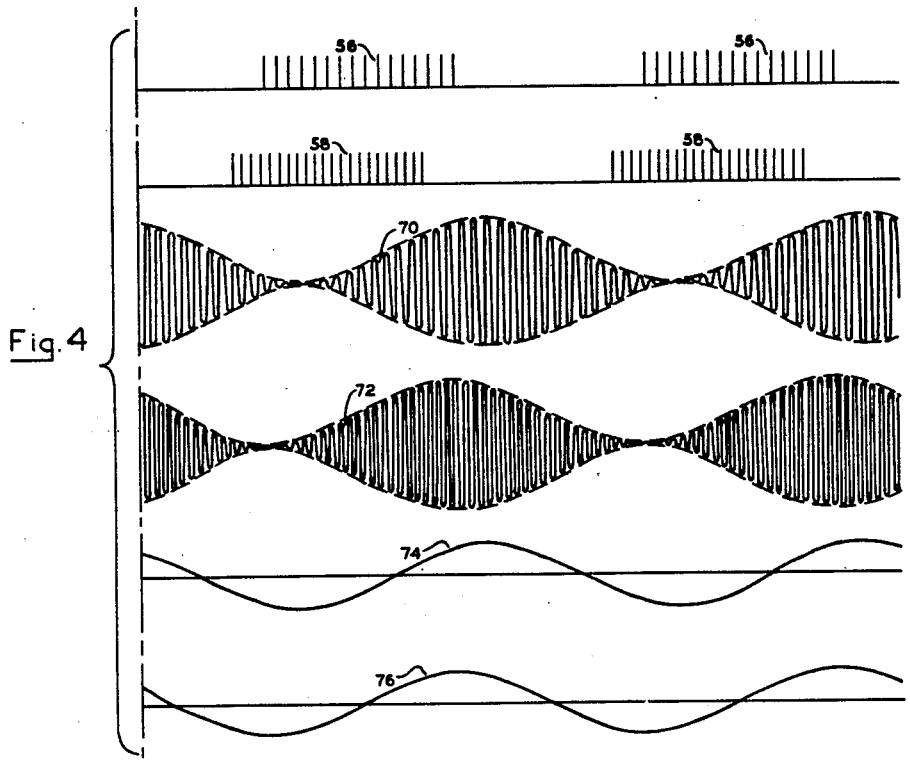
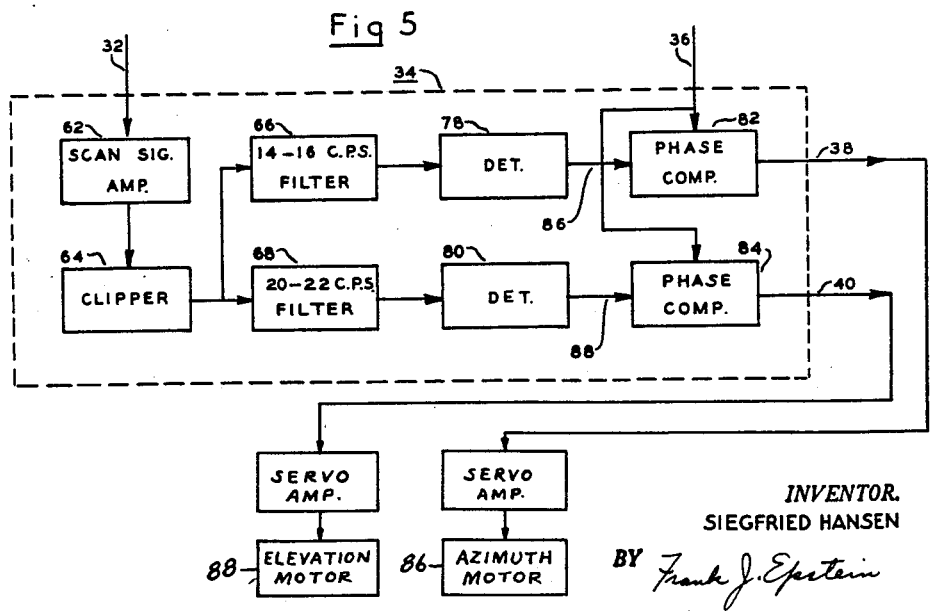
INVENTOR.
SIEGFRIED HANSEN
BY Frank J. Epstein

United States Patent Office 2,941,080
Patented June 14, 1960

2,941,080

ASTROMETRICAL MEANS AND METHOD

Siegfried Hansen, Los Angeles, Calif., assignor, by mesne assignments, to Hughes Aircraft Company, a corporation of Delaware Filed Nov. 6, 1948, Ser. No. 58,657

25 Claims. (Cl. 250—203)

The invention disclosed herein relates to methods and means for determining the presence and location of a relatively small body in an encompassing field of view, and in particular to a novel electro-optical system for deriving position signals defining the location of said body.

The invention will be described with reference to an embodiment for use in star-tracking systems. The field of view in this instance is a sky area subtended by the solid angle "visible" to a sighting structure, a stellar body appearing therein as a very small area having a greater luminous intensity than does the immediately surrounding region in the field of view.

Stated generally, an electro-optical star-tracking apparatus usually comprises a sighting structure, an optical shutter or scanner, an illumination converter and associated electrical circuits. The scanner functions to expose certain areas of the sighting structure's field of view to the converter, in progression, so that the luminous flux applied to the converter exhibits modulation when the field of view encompasses a stellar body. The converter translates the modulation to corresponding electrical signals, here termed scan signals, from which position or control signals are derived. The position signals may be utilized to so control orienting mechanism associated with the sighting structure that the stellar body is retained within the field of view.

Star-tracking apparatus as above described may operate satisfactorily when bright bodies are to be tracked, and when the background field possesses no more than a very low intensity of uniform illumination. Conditions often arise, however, in which the field of view encompassing the selected stellar body includes areas of appreciable illumination. Conventional apparatus of this nature is unable, in effect, to discriminate the stellar body from adjacent luminous areas in the field of view, and such equipment then fails to provide usable position signals.

It is an object of the present invention to provide a novel and improved electro-optical scanning and conversion system which provides high discrimination of a stellar body sighted upon.

In my copending application Serial No. 771,762, filed September 2, 1947, and entitled "Star-Tracking System," I have disclosed a prototype star-tracking apparatus which achieves a relatively high order of discrimination of stellar bodies, by pulsing only the stellar light without substantially affecting the level of background illumination as seen by the conversion component. While this apparatus constitutes a considerable advance in the art and successfully tracks many navigational stars, its electrical noise level does not permit tracking of relatively faint stars. The scan signals produced in this prototype system bear frequency modulation characteristic, requiring the use of an amplifier having a bandwidth sufficient to contain the maximum deviation of the signal and therefore having a relatively high noise level. Again, certain characteristics of the scanning system of this apparatus limits, to a smaller value than is desirable, the usable angular field of view in which tracking can be accomplished.

It is therefore another object of the present invention to provide an electro-optical system in which scanning, conversion and derivation circuits cooperate to provide position-identifying signals having a relatively large signal-to-noise ratio.

It is still another object to provide an improved electro-optical system which provides position signals defining the position coordinates of a stellar body within the angular limits of a field of view.

In carrying out certain objects of the invention I provide an electro-optical system capable of tracking a source of radiation, said system including an optical system for intercepting radiation from said source when said source is within the field of view of said optical system, a scanner in said optical system to convert the intercepted radiation into a composite radiation wave including first groups of spaced pulses, these pulses having a frequency $f_1$, second groups of spaced pulses having a frequency $f_2$, an electronic system coupled to the optical system and converting said composite wave into a corresponding composite electrical wave including first spaced groups of electrical pulses and second spaced groups of electrical pulses, a first channel to extract said first pulses and a second channel to extract said second pulses, the time of occurrence of the respective groups of pulses with respect to a reference signal being a function of the position of the radiation source with respect to the optical axis of the optical system.

I also provide an optical system for a radiation source tracking system, said optical system having a scanner which converts the radiation from said source into first equally spaced groups of radiation pulses and second equally spaced groups of radiation pulses for defining the relative position of said source with respect to the optical system in terms of relative positions of said groups of pulses with respect to a reference signal, the phase of the first and second groups of pulses with respect to said reference signal continuously defining the position of the image of said source on said scanner with respect to the optical axis of said optical system.

Figure 2:
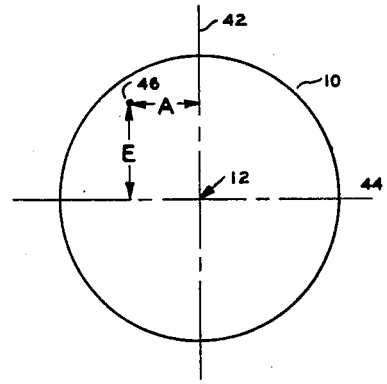
Figure 3:
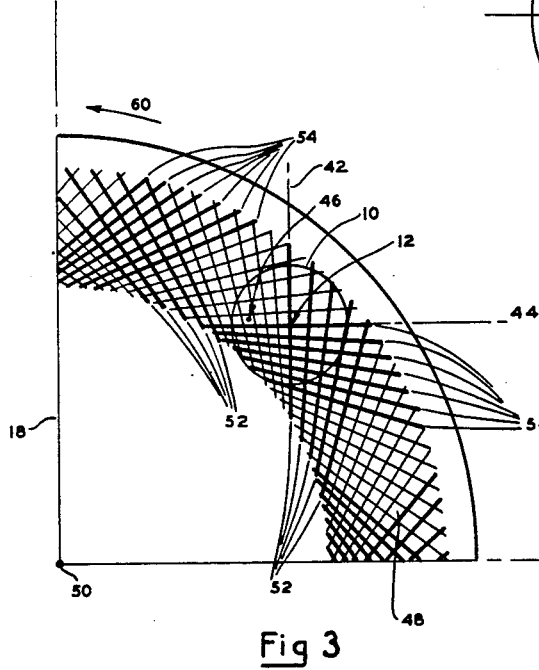
Figure 6:
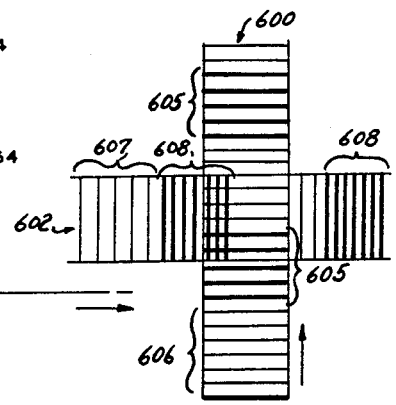
Figure 7:

These and other objects, features and advantages of the present invention will appear from the following description taken in connection with the accompanying drawing in which: Figure 1 is a schematic representation and illustrative embodiment of the invention; Figure 2 indicates the appearance of a sighting structure's field of view; Figure 3 diagrammatically details a quadrant sector of a novel scanning shutter employed in the apparatus of Figure 1; Figure 4 is a group of time-base graphs which are referred to in describing the invention; Figure 5 is a block diagram of a derivation circuit which is employed in the apparatus of Figure 1; Fig. 6 is a diagrammatic drawing of a dual tape shutter for more clearly describing the operation of the shutter shown in Fig. 3; and Fig. 7 is a diagrammatic drawing of a continuous tape shutter for more clearly describing the operation of the shutter shown in Fig. 3. In the several figures similar parts are designated by similar reference characters.

The production of position-identifying signals in accordance with the present invention may be accomplished as schematically illustrated in Figure 1. A field of view or field image 10, centered about an axis 12 and encompassing a selected stellar body, is here provided by an objective lens 14. An infra-red transmitting filter 16 may be included as shown to increase the contrast between the selected star and illuminated sky background. Field of view 10 is projected against a scanning or modulating shutter 18, later described in detail, having a grid-work including large number of optical apertures which pass light from the selected stellar body in the form of discrete pulses, the apertures being of the same order of size as the apparent size of a stellar body in field of view 10. The apertures in the grid-work are thus quite small and their presence is schematically indicated by the series of dots shown in shutter 18 in Figure 1, and in another manner in Figure 3 later referred to. In the embodiment here shown, shutter 18 is circular and arranged to be rotated by rim drive through gearing driven by a motor 20. A generator 22 also driven by the same means provides reference signals which are utilized in the derivation of position signals.

The starlight pulses, and a relatively constant amount of background field illumination also passed by shutter 18, are focused by a condenser lens system 24 upon phototube 26 of a light-conversion apparatus 28. A field-limiting diaphragm 30 may also be included as illustrated to confine the illumination reaching phototube 26 to that arising from the selected field of view. The pulse component of the luminous flux impinging upon phototube 26 which represents a composite radiation wave including equally spaced first groups of spaced pulses, these pulses having a repetition frequency $f_1$, and similar second groups, the pulses in the second groups having a repetition frequency $f_2$, is translated by light-conversion apparatus 28 to a corresponding composite electrical wave including correspondingly pulsed scan signals having repetition frequencies $f_1$ and $f_2$ and having stellar body position-identifying characteristics as will appear. These scan signals are supplied over a conductor 32 to position-signal derivation circuits 34, later detailed and described, to which are also supplied over conductor 36 the reference signals from generator 22. The resultant position-identifying signals at conductors 38 and 40 may be applied to indicators or supplied to other utilization circuits as desired.

Referring now to Figure 2, the general appearance of the sighting structure's field of view is illustrated by the circular area 10, assumed for purposes of description to lie in a vertical plane, in which the numeral 12 again designates the sighting structure's optical axis, here seen as a point. Reference lines 42 and 44 extending through reference point 12 are the coordinate axes from which are measured the component displacements of the stellar body sighted upon. Reference lines 42 and 44 are here shown as vertical and horizontal, respectively, corresponding to the conventional component directions in which a sighting structure is angularly displaced in training it upon a selected stellar body. Thus, any training error or deviation of the sighting structure's optical axis from the true line-of-sight to a selected stellar body, evidenced by the stellar body appearing at some point 46 displaced from reference position 12, may be reduced to zero by displacing the sighting structure about its horizontal and vertical orientation axes through angles corresponding to the coordinates A and E of point 46.

As will later appear, the coordinate distances A and E of a stellar body sighted upon are continuously translated into corresponding coordinate signals, hereinafter also termed position signals. The examining action from which stems the production of these position signals involves scanning the field of view in two distinct directions. One scanning examination is made along lines which extend substantially parallel to reference line 42 while sweeping across field 10, an action here termed vertical line scan. The other scanning examination is made along lines which extend substantially parallel to reference line 44 while sweeping across the field, correspondingly termed horizontal line scan.

The manner in which this scanning action may be accomplished with the rotary scanner is detailed in Figure 3, in which a quadrant sector of the novel rotary shutter 18 is shown in diagrammatic form. Rotary shutter 18 carries a mosaic pattern of optical apertures in annular area 48 which is concentric to shutter axis 50.

Shutter 18 is to be understood as so positioned that field of view 10 is "seen" or examined through the shutter apertures by phototube 26 of Figure 1. Rotary shutter 18 is further so positioned that the plane defined by shutter axis 50 and optical axis 12 lies at a 45 degree angle to a vertical plane through optical axis 12. In order to clearly set forth the description and operation of the mosaic pattern of apertures, a network of scan lines upon which they are formed is here shown. The apertures themselves are to be understood as lying at the intersections of these scan lines and, so far as the action of the apertures is concerned, the scan lines may in fact be regarded as representing optical slits. A simpler form of scanner is obtained if the disc 18 is made of transparent material and a plurality of opaque lines is placed on one surface of the disc, as illustrated in Fig. 3. The scan lines or grid-work of major importance fall in two series of distinct groups 52 and 54 and are so arranged in shutter 18 that, in crossing optical axis 12, the scan lines of groups 52 and 54 assume vertical and horizontal directions, respectively, corresponding to the directions of field reference lines 42 and 44. The scanning actions of groups 52 and 54 thus restrict the field areas examined to narrow strips or bands which extend substantially parallel to reference lines 42 and 44, respectively, while traversing field 10.

In a typical instance which is chosen by way of example and here illustrated, shutter 18 and annular area 48 are dimensioned to accommodate 9 groups of vertical scan lines and 9 groups of horizontal scan lines, each group of a series occurring at 40 degree intervals and each group extending about 20 degrees as measured along any circle drawn about point 50 as a center and lying in annular area 48. For purposes which will appear, the number of scan lines within a group and their spacing therein differ in the two distinct series. While for clarity of illustration but 5 and 7 lines are shown in groups 52 and 54, respectively, it is to be understood that a larger number of lines are here contemplated. In particular, the vertical scan groups may each consist of 15 scan lines spaced at 20/15 degree intervals, and the horizontal scan groups may each consist of 21 scan lines spaced at 20/21 degree intervals.

The scanning action of the shutter thus far described, upon a field encompassing a stellar body, results in the production of a starlight pulse at each instant that a band represented by a scan line comes into registry with the stellar body. Shutter 18 is here rotated at an angular speed of 20 degrees per second, or approximately 3.3 revolutions per minute, and the repetition rates of the signal pulses resulting from action of scan line groups 52 and 54 are correspondingly 15 pulses per second and 21 pulses per second, respectively. It is evident that the vertical and horizontal line scan pulses are here interlaced in a single grid producing a composite radiation wave including two series of scan pulses, one series representing horizontal scan signals, while the other the vertical scan signals. However, the derivation circuits later described function to effectively separate the vertical and horizontal scan signals and to extract their time-position characteristics. For purposes of facilitating their identification, the signal pulses may therefore be visualized as falling in separate and distinct scan groups. Thus, the vertical and horizontal scan signals may be separately represented as in the first two time-base graphs of Figure 4, in which the pulses are schematically shown simply as short lines falling in two distinct series of vertical and horizontal scan groups 56 and 58, respectively. It is apparent that the instants at which scan pulse groups 56 and 58 are formed, relative to the instants at which scan line groups 52 and 54 cross reference position 12, are dependent upon and directly correlated to the stellar body position relative to the horizontal and vertical reference lines in field 10. For example, the time-positions of the scan signal groups shown at 56 and 58 in Figure 4 correspond to the conditions shown in Figure 3 in which, as seen from the light-conversion device 26, shutter 18 is rotated in the counter-clockwise direction indicated by arrow 60, and in which the steller body appears in the upper left quadrant of field of view 10 at a point 46 lying at a greater distance from vertical reference line 42 than from horizontal reference line 44.

Referring again to Figure 4, and to Figure 5 in which the derivation circuit 34 is detailed as a combination of conventional units, the scan signals 56 and 58 are applied over conductor 32 to a pulse amplifier 62, thence to a clipper 64 which limits the pulse amplitude to a constant value. The fixed amplitude pulses are applied to filters 66 and 68 which are designed for operation over the narrow bands of substantially 14 to 16 c.p.s. (cycles per second) and substantially 20 to 22 c.p.s., respectively. Filter 66 here functions to respond principally to the 15 c.p.s. carrier component of the vertical scan signal and two sidebands due to group modulation (½ cycle per second) thereof, attenuating other sidebands inherently present in the vertical scan signal and providing an output signal 70 which is substantially sinusoidally modulated. The manner in which this takes place may be explained by considering the vertical scan signal to be a continuous series of pulses, occurring at a carrier rate of 15 per second, modified by a square modulation wave having, in the particular embodiment here described, a frequency of ½ c.p.s. as determined by the group frequency of the scan signal. A harmonic analysis of the continuous series of pulses would indicate a major sinusoidal component at 15 c.p.s. and other components at harmonic frequencies thereof. Similarly, analysis of the modulation wave would indicate a major sinusoidal component occurring at ½ c.p.s. While many signal components having cross product frequencies are thus present in the scan signal, those having greatest amplitude are the carrier component at 15 c.p.s. and the two sideband components at 14½ and 15½ c.p.s., respectively. The 15 c.p.s. carrier and its sidebands due to ½ c.p.s. modulation are thus accepted by filter 66, resulting in an output signal appearing substantially as at 70 in Figure 4. Similarly, filter 68 responds principally to the 21 c.p.s. carrier component of the horizontal scan signal and two sidebands due to group modulation thereof, providing an output signal 72 substantially as shown. The ½ c.p.s. modulation signal components, shown at 74 and 76 in Figure 4, are extracted from output signals 70 and 72 by detection circuits 78 and 80, respectively. It is apparent that modulation signals 74 and 76 bear a fixed time-relationship to scan signal groups 56 and 58, and that their phase conditions with respect to a reference signal thereby serve to define the stellar body position coordinates in azimuth and elevation. This characteristic is utilized in the derivation of position signals, in this instance by means of phase comparator circuits 82 and 84 to which are applied modulation signals 74 and 76 over conductors 86 and 88, respectively, and to which are also applied the reference signals from generator 22 over conductor 36. Generator 22 and its gearing to shutter 18, shown in Figure 1, are designed to provide reference signals of sinusoidal waveform at the frequency of the modulation signals. The system is adjusted so that modulation signals 74 and 76 are at quadrature to the reference signal for a stellar body appearing at reference point 12, as required for zero output signals from phase comparators 82 and 84 to represent or define this stellar body zero position. A displacement of the stellar body from reference position 12 causes modulation signals 74 and 76 to be shifted in phase, from their initial quadrature condition to the reference signal, by amounts corresponding to coordinate distances A and E, respectively. Phase comparators 82 and 84 correspondingly produce D.-C. position signals having amplitudes and polarities defining the azimuth and elevation position coordinates of the stellar body with respect to the optical axis 12 of the optical system, and the reference axes 42 and 44 bisecting the field of view as it appears on the scanning disc.

Referring again to Figure 3, the supplementary gridwork or scan lines filling the areas between successive groups 52, and the supplementary scan lines filling the areas between successive groups 54, positioned to assume vertical and horizontal directions respectively, in crossing reference point 12, are provided for the purpose of avoiding the strong modulation at group frequency (½ cycle rate) which would otherwise obtain because of the variation in average density of the scanning disc. Thus the function performed by the auxiliary lines is to render the average capacity or average density of the scanner substantially uniform. The supplementary scan lines are here for convenience shown in reduced number. It is to be understood that a larger number of such scan lines is contemplated, in this instance a number suitable to result in starlight modulation at a frequency of 18 pulses per second, intermediate between the repetition frequencies of pulses 56 and 58 produced by the major scan lines. The pulsed starlight resulting from action of the supplementary scan lines are rejected by filters 66 and 68, insuring the avoidance of any ambiguities in the final position-defining signals.

The described apparatus thus provides the requisite information to indicate the presence and precise location of a stellar body in a selected field of view in azimuth and elevation, in terms of the azimuth and elevation corrective or position-defining signals. It is believed to be within the skill of those versed in the art to employ the information derived in the form and manner described for any desired purpose. For example, the azimuth elevation signals may be employed to actuate suitable orienting servo mechanism 86 and 88 geared to the sighting structure and actuated by the phase comparators 82 and 84, whereby to continuously train the sighting structure upon the selected stellar body. Servo mechanisms are well known in the art and, therefore, need no further description.

While in the particular embodiment here described specific frequencies have been mentioned, so selected that no harmonic or cross product frequencies will cause false signals or interaction between the vertical and horizontal scan channels, it is apparent that having now disclosed the method and means of the present invention many other frequency combinations may be utilized.

Further, while there has been described what at present is considered a preferred embodiment of the invention, it will be obvious to those skilled in the art that various changes and modifications may be made without departing from the invention. As one example, a shutter of continuous tape form as shown in Figure 7 may be substituted for the rotary shutter here shown. As another example, as shown in Figure 6 dual shutters 600 and 602 may be employed, one bearing vertical scan lines 607 and 608, the other bearing horizontal scan lines 605 and 606, for scanning identical images of the field of view; together with separate signal derivation channels. It is therefore the purpose of the appended claims to define the invention and to cover all such changes and modifications as fall within the true spirit and scope thereof.

What is claimed is:

1. A rotary shutter for scanning action upon a field of view which may be projected thereagainst, said field of view encompassing a relatively small area of interest characterized by an illumination intensity differing from that of adjoining regions in said field of view, said field of view further having a reference point therein, a circular trace being defined upon said shutter by said reference point during projection of said field and rotation of said shutter, said shutter having optical apertures of the same order of size as the apparent size of said area of interest, said optical apertures lying at the intersections of two series of scan lines which extend across said circular trace, each scan line of one said series lying at substantially a 45 degree angle as measured in one direction from a radial line extending through the point at which the scan line intersects said circular trace, and each scan line of the other said series lying at substantially a 45 degree angle as measured in a counter direction from a radial line extending through the point at which the scan line intersects said circular trace.

2. An astrometrical apparatus, comprising: conversion means for translating variations of luminous flux applied thereto into corresponding scan signals; means for applying, to said conversion means, luminous flux derived from a selected sky field encompassing a stellar body; means for restricting the luminous flux so applied to that arising from field areas registering with first bands which scan or traverse said field while extending thereover in a direction substantially parallel to a first reference axis therein, and from field areas registering with second bands which scan or traverse said field while extending thereover in another direction substantially parallel to a second reference axis therein, whereby the variations in luminous flux so restricted are starlight pulses occurring at instants that said stellar body registers with said bands, said first bands having widths and spacings of the order of the apparent diameter of said stellar body, said first bands being further arranged to cause the scan signals corresponding to their scanning action to fall in a series of distinct repetitive groups, said second bands having widths and spacings of the order of the apparent diameter of said stellar body, said second bands being further arranged to cause the scan signals corresponding to their scanning action to fall in a second series of distinct repetitive groups; means utilizing said first series of repetitive groups to derive a first coordinate signal having characteristics related to the direction and magnitude of time-displacement of said first series of groups relative to the time-positions at which said first series of groups would occur for a stellar body located upon said first reference axis; and means utilizing said second series of groups to derive a second coordinate signal having characteristics related to the direction and magnitude of time-displacement of said second series of groups relative to the time-positions at which said second series of groups would occur for a stellar body located upon said second reference axis; whereby said coordinate signals define the location of said stellar body relative to said reference axes.

3. An astrometrical apparatus, comprising: conversion means for translating variations of luminous flux applied thereto into corresponding scan signals; means for applying, to said conversion means, luminous flux derived from a selected sky field encompassing a stellar body; means for restricting the luminous flux so applied to that arising from field areas registering with bands which scan or traverse said field while extending thereover in a direction substantially parallel to a reference axis therein, said bands having widths and spacings of the order of the apparent diameter of said stellar body, whereby the luminous flux so restricted exhibits a continuous series of pulse variations occurring at instants that said stellar body registers with said bands, said bands being further arranged to cause said pulse variations, and correspondingly said scan signals, to fall in distinct, repetitive groups; and means utilizing said scan signals to derive a position signal having characteristics related to the direction and magnitude of time-displacement of said repetitive groups relative to the time-positions at which said groups would occur for a stellar body located upon said reference axis, said position signal thereby defining the location of said stellar body relative to said reference axis.

4. An electro-optical apparatus, comprising: means for imaging a stellar body lying in a selected background field having intersecting first and second reference axes therein; scanning means for isolating the luminous flux of field areas progressively defined by a first group of examination strips which recurrently sweeps over said imaged field, and for isolating the luminous flux of field areas progressively defined by a second group of examination strips which recurrently sweeps over said imaged field, the strips of said first and second groups extending substantially parallel to said first and second reference axes, respectively, while sweeping said field; conversion means for obtaining groups of scan signals corresponding to isolated flux pulse-variations occurring at instants that said strips register with said imaged stellar body; and means for deriving first and second position signals having characteristics related to the time-displacements of said first and second groups of scan signals, respectively, relative to the time-positions at which said groups would occur for a stellar body located at the intersection of said reference axes, said position signals thereby defining the imaged position of the stellar body relative to said reference axes.

5. An electro-optical apparatus, comprising: means for imaging a stellar body lying in a selected background field having a reference axis therein; scanning means for isolating the luminous flux of field areas progressively defined by a group of examination strips which periodically sweeps over said imaged field, said strips extending in a direction substantially parallel to said reference axis in sweeping over said field; conversion means for deriving groups of scan signals corresponding to isolated flux pulse-variations occurring at instants that said strips register with said imaged stellar body; and means for deriving a position signal, having characteristics related to the time-displacement of said groups of scan signals relative to the time-positions at which said groups would occur for a stellar body located upon said reference axis, said position signal thereby defining the imaged position of the stellar body relative to said reference axis.

6. An apparatus for electro-optically determining the location, relative to intersecting first and second reference axes in a background field, of a relatively small area of interest characterized by a radiation intensity differing from that of the encompassing background field, comprising: scanning means for progressively isolating the radiant flux of first field areas, defined by at least one examination strip which recurrently sweeps said field while extending thereover in a direction substantially parallel to said first reference axis, and of second field areas, defined by at least one examination strip which recurrently sweeps said field while extending thereover in a direction substantially parallel to said second reference axis; conversion means for obtaining first and second scan signals from isolated flux pulse-variations occurring at instants that said strips define first and second field areas, respectively, containing said small area of interest; and means for deriving first and second coordinate signals having characteristics related to the time-displacements of said first and second scan signals, respectively, relative to the time-positions at which said scan signals would occur for said area of interest located at the intersection of said first and second reference axes, said coordinate signals thereby defining the location of said area of interest relative to said reference axes.

7. An electro-optical apparatus, comprising: a sighting structure for defining a field of view and a reference point therein, said field of view encompassing a relatively small area of interest demarcated from adjoining regions by differing radiation intensity; scanning means for progressively isolating the radiant flux of first field areas, defined by at least one examination strip which extends over and recurrently sweeps said field, and of second field areas, defined by at least another examination strip which extends over and recurrently sweeps said field in a manner to cause said first field areas to be intersected by said second field areas; conversion means for obtaining first and second scan signals from isolated flux pulse-variations occurring at instants that said strips define first and second field areas, respectively, containing said small area of interest; means for deriving first and second position signals having characteristics related to the time-displacements of said first and second scan signals, respectively, relative to the time-positions at which said scan signals would occur for said area of interest located at said reference point; and utilization means controlled by said position signals.

8. An electro-optical apparatus, comprising: a sighting structure for defining a field of view and a reference point therein, said field of view encompassing a relatively small area of interest demarcated from adjoining regions by differing radiation intensity; scanning means for progressively isolating the radiant flux of first field areas, defined by at least one examination strip which extends over and recurrently sweeps said field, and of second field areas, defined by at least another examination strip which extends over and recurrently sweeps said field in a manner to cause said first field areas to be intersected by said second field areas; conversion means for obtaining first and second scan signals from isolated flux pulse-variations occurring at instants that said strips define first and second field areas, respectively, containing said small area of interest; means for deriving first and second position signals having characteristics related to the time-displacements of said first and second scan signals, respectively, relative to the time-positions at which said scan signals would occur for said area of interest located at said reference point; and servo-means utilizing said position signals for continuously and accurately training said sighting structure upon said relatively small area of interest.

9. An electro-optical method of training a sighting structure upon a relatively small area of interest demarcated from adjoining regions of its background field by differing radiation intensity, comprising: progressively determining the radiant flux of first field areas, defined by at least one examination strip which extends over and recurrently sweeps said field, and of second field areas, defined by at least another examination strip which extends over and recurrently sweeps said field in a manner to cause said first field areas to be intersected by said second field areas; converting into a first scan signal the radiant flux pulse-variations evidenced at instants that said strips define first field areas containing said small area of interest; converting into a second scan signal the radiant flux pulse-variations evidenced at instants that said strips define second field areas containing said small area of interest; deriving position signals serving as measures of the time-displacements of said first and second scan signals, respectively, relative to the time-positions at which said scan signals would occur for said small area of interest at a field point representing the training direction of the sighting structure; and training said sighting structure in a direction to minimize said time-displacements.

10. An electro-optical method of determining the location, relative to intersecting first and second axes in a background field, of a relatively small area of interest characterized by a radiation intensity differing from that of adjoining regions in the encompassing background field, comprising: progressively determining the radiant flux of first field areas, defined by at least one examination strip which recurrently sweeps said field while extending thereover in a direction substantially parallel to said first reference axis, and of second field areas, defined by at least one examination strip which recurrently sweeps said field while extending thereover in a direction substantially parallel to said second reference axis; converting into a first scan signal the radiant flux pulse-variations evidenced at instants that said strips define first field areas containing said small area of interest; converting into a second scan signal the radiant flux pulse-variations evidenced at instants that said strips define second field areas containing said small area of interest; and deriving position signals serving as measures of the time-displacements of said first and second scan signals, respectively, relative to the time-positions at which said scan signals would occur for said small area of interest located at the intersection of said reference axes, whereby said position signals define the location of said small area of interest relative to said reference axes.

11. A radiation source tracking system comprising an optical system for intercepting radiation from said source when said source is within the field of view of said optical system, said optical system including a rotating scanner to convert said radiation into a composite radiation wave including first groups of spaced pulses, said first pulses having a repetition frequency $f_1$, and second groups of spaced pulses, said second pulses having a repetition frequency $f_2$, an electronic system coupled to said optical system, said electronic system including means for converting said composite wave including said first and second groups of pulses into a corresponding composite electrical wave including first spaced groups of electrical pulses and second spaced groups of electrical pulses, a first channel to extract said first pulses, the time of occurrence of each group of said first electrical pulses being a function of an abscissa of the image of said source on said scanner, said abscissa passing through the optical axis of said optical system, and a second channel to extract said second pulses, the time of occurrence of each group of said second pulses being a function of the ordinate of said image on said scanner, said ordinate also passing through said optical axis.

12. A radiation source tracking system comprising an optical system for intercepting radiation from said source, said optical system having an optical axis normally pointed in the direction of said source whereby said source is within the field of view of said optical system; a scanning means, constituting a part of said optical system, having a disc with a plurality of apertures to convert said radiation into a composite waveform, said apertures being spaced on said disc to produce first spaced groups of pulses having a repetition frequency $f_1$, and second spaced groups of pulses having a repetition frequency $f_2$, the time of occurrence of said first and second groups of pulses being a function of radial and angular displacement of said source with respect to the optical axis of said optical system.

13. A radiation source tracking system as defined in claim 12 which also includes an electronic system coupled to said optical system, said electronic system having first means to produce a first substantially sinusoidally modulated signal having said frequency $f_1$, a second means to produce a second substantially sinusoidally modulated signal having said frequency $f_2$, and an additional means connected to said first and second means, said additional means also including a source of reference signals, said source of reference signals being coupled to said scanning means whereby the phase of said reference signals is controlled and is in constant synchronism with the angular position of said scanning means, said additional means pointing said optical axis at said source in response to any difference in phase between the modulation envelope of said first signal and said reference signal, and any difference in phase between the modulation envelope of said second signal and the phase of said reference signal.

14. A radiation source tracking system as defined in claim 12, in which said plurality of apertures are disposed on said disc between two concentric circles having their centers located on the axis of rotation of said disc, and in which the periods of sinusoidal modulations of said frequencies $f_1$ and $f_2$ are equal.

15. A radiation source scanning apparatus comprising an optical system for intercepting radiation from said source, said optical system having an optical axis normally pointed in the direction of said source to encompass said source within the field of view of said optical system, said optical system including a scanner to convert said radiation into a composite radiation wave including first spaced groups of radiation pulses, and second spaced groups of radiation pulses, the time of occurrence of said first and second groups being a function of radial and angular displacement of said source from the optical axis of said optical system, and an electronic system coupled to said optical system, said electronic system having means to convert said radiation pulses into correspondingly spaced groups of first and second electrical pulses.

16. A radiation source scanning system as defined in claim 15 in which said disc is a transparent disc having a plurality of apertures within a grid-work, said grid-work being defined by first spaced groups of opaque lines, said first groups being circularly disposed on said disc and being uniformly spaced from each other, and second groups of opaque lines, said first and second groups being superimposed upon each other, and the lines of the first group intersecting the lines of the second group, the lines of each first group being angularly positioned with respect to each other and having progressively increasing spacings, toward the outer periphery of said disc, between adjacent lines in each group to produce said first spaced groups of pulses, and the lines of each second group being angularly positioned with respect to each other and having similarly progressively increasing spacings between adjacent lines in each group to produce said second spaced groups of pulses, said first and second pulses having constant repetition rates, respectively, irrespective of the position of the image of said source on said disc.

17. A radiation source scanning system as defined in claim 16 in which the angles spanned by each first group of lines is equal to the angle spanned by each second group of lines, and the number of lines in the first group being greater than the number of lines in the second group.

18. A radiation source scanning system as defined in claim 16, in which the spaces on said disc between said groups has a second grid-work of opaque lines partially overlapping the first grid-work.

19. A radiation source scanning system as defined in claim 15 in which said scanner includes a group of apertures on said scanner, each group having rows of apertures spaced from each other to produce said first and second series of radiation pulses having repetition frequencies $f_1$ and $f_2$, said frequencies representing the outputs due to the horizontal and vertical scanning of the image of said source on said scanner.

20. A radiation source scanning system as defined in claim 15 in which said scanner comprises a rotating disc having a plurality of apertures on said disc, said apertures lying in a circular band defined by two concentric circles, the center of said circles coinciding with the axis of rotation of said disc, the radial spacings of said apertures being a function of the radial distance of said apertures from the axis of said disc to produce a constant frequency within said first and second spaced groups, respectively, irrespective of the radial position of the image of said source on said scanner.

21. A radiation source scanning apparatus as defined in claim 15 in which said scanner constitutes a transparent rotating disc with a plurality of intersecting opaque and variably spaced lines, the small areas between said lines defining radiation transmitting apertures on said disc, said apertures producing said composite radiation wave, said apertures lying in a circular path defined by two concentric circles, the center of said circles coinciding with the axis of rotation of said disc, the relative positions of said lines on said disc being equivalent to first and second transparent scanners moving with equal velocities at right angles to each other, said first scanner moving in a horizontal direction, and said second scanner moving in a vertical direction, said first scanner having first groups of spaced opaque lines perpendicular to the direction of motion of said first scanner, said first groups of lines producing said first spaced groups of radiation pulses, and auxiliary groups of spaced opaque parallel lines, filling the spacings between the first groups, the auxiliary lines being parallel to the lines in said first groups, said second scanner having second groups of spaced opaque lines perpendicular to the lines on said first scanner, said second groups of lines producing said second spaced groups of radiation pulses, and auxiliary groups of spaced lines parallel to the lines in said second groups and having line spacings equal to the line spacings of said auxiliary groups of lines on said first scanner, said auxiliary groups of lines producing auxiliary spaced groups of radiation pulses.

22. A radiation source scanning apparatus as defined in claim 21 wherein said electronic system is coupled to the output of said scanner, said electronic system having a first filter for extracting from said composite wave the spaced groups of said first electrical pulses, a second filter for extracting from said composite electric wave the spaced groups of said second electrical pulses, the line spacings between adjacent lines in all of said groups of spaced parallel lines being spaced to produce the cross-modulation products due to superposition of the two sets of lines rejectable by said first and second filters.

23. A radiation source scanning system as defined in claim 15 in which said scanner has a plurality of apertures for producing said first and second series of radiation pulses having fundamental frequencies $f_1$ and $f_2$, respectively, an amplifier in said electronic system, a limiter connected to said amplifier, and two parallel electronic channels connected to said limiter, each of said channels including a bandpass filter, a detector, and a phase comparator, one of said bandpass filters having a bandpass center frequency $f_1$, and the other of said bandpass filters having the bandpass frequency $f_2$.

24. A radiation source scanning system as defined in claim 23 in which each of said phase comparators is connected to a source of reference signals, the phase of said reference signals being controlled by the angular position of said scanner, whereby said reference signals continuously represent, in electrical terms, the angular position of said scanner at said phase comparators.

25. A star tracking system including an optical system having its optical axis normally pointed at said star, a scanner within said optical system, said scanner having means to convert radiation from said star into first and second groups of radiation pulses having repetition frequencies $f_1$ and $f_2$, respectively, a photo-electric cell in radiation-intercepting relationship with respect to said optical system, said cell producing first and second groups of electrical pulses in response to said radiation pulses, a source of reference signals synchronized with said scanner, and first and second phase comparator channels connected to said photoelectric cell and to said source of reference signals, said first channel generating a direct current signal whose amplitude and polarity is a function of the deviation of the image of said star in azimuth from the central position on said scanner, and said second channel generating a direct current signal whose amplitude and polarity is a function of the deviation of the image of said star in elevation from the central position on said scanner.

References Cited in the file of this patent

UNITED STATES PATENTS

| | | |
|---|---|---|
| 1,910,540 | Hammond | May 23, 1933 |
| 2,462,925 | Varian | Mar. 1, 1949 |
| 2,488,430 | Offner | Nov. 15, 1949 |
| 2,513,367 | Scott | July 4, 1950 |